June 23, 1931.　　　　J. P. WEAVER　　　　1,811,769
TELEMETRIC INDICATING SYSTEM
Filed July 31, 1929　　　2 Sheets-Sheet 1
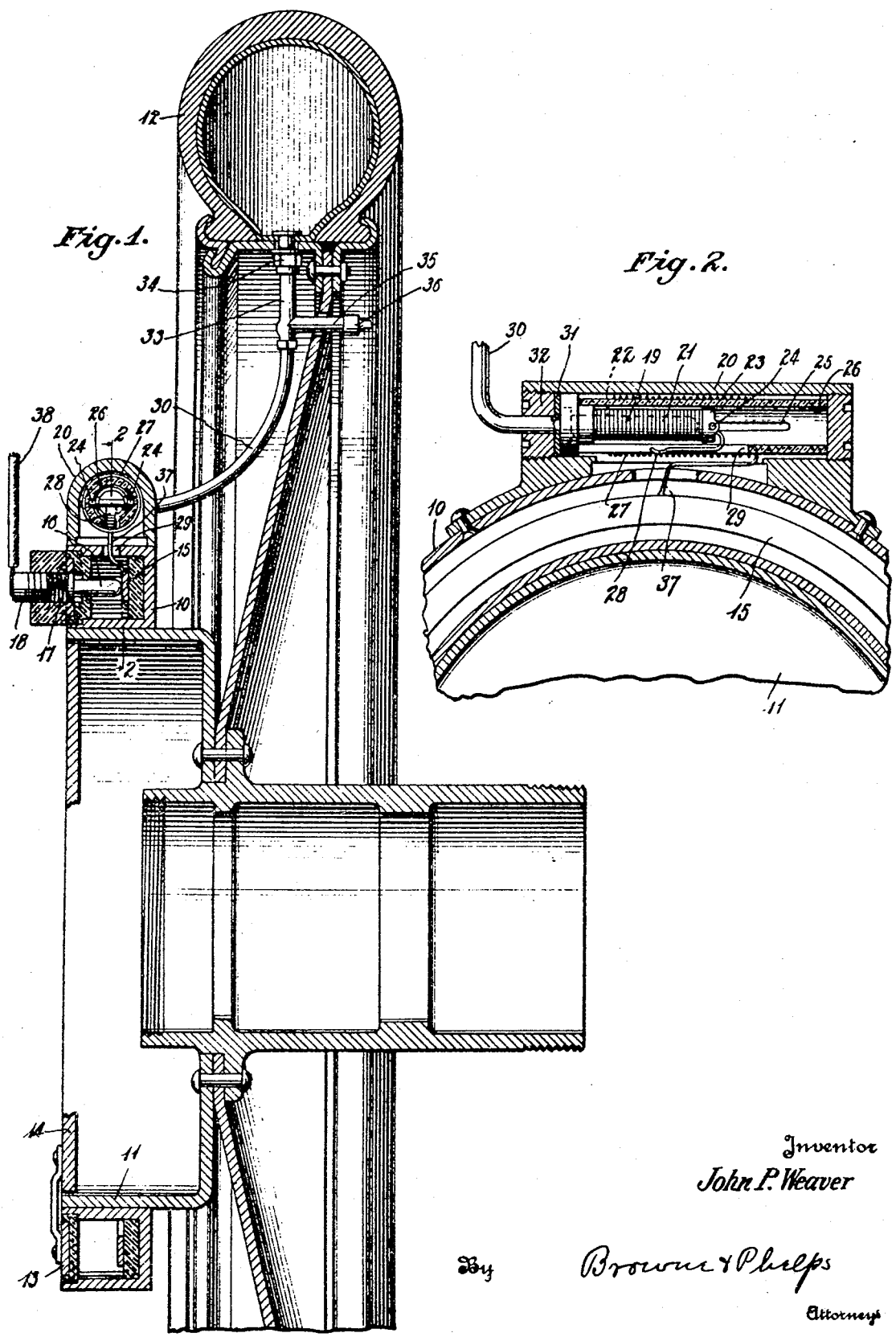
Inventor
John P. Weaver
By Brown & Phelps
Attorneys June 23, 1931.                    J. P. WEAVER                    1,811,769
                         TELEMETRIC INDICATING SYSTEM
                    Filed July 31, 1929        2 Sheets-Sheet 2

Inventor
John P. Weaver
By Brown & Phelps
Attorneys

Patented June 23, 1931

1,811,769

UNITED STATES PATENT OFFICE

JOHN P. WEAVER, OF ANDERSON, INDIANA

TELEMETRIC INDICATING SYSTEM

Application filed July 31, 1929. Serial No. 382,551.

The invention relates to indicators and has as an object the provision of a device for testing the inflation of tires.

It is a further object of the invention to provide a device for testing the inflation of tires upon a vehicle while in motion.

It is a further object of the invention to provide a device for testing the inflation of tires utilizing a resistance element and a specially calibrated voltmeter for furnishing the indication.

It is a further object of the invention to provide a testing device having a voltmeter with a movable dial which may be adjusted to compensate for partial discharge of the battery.

Further objects of the invention will appear from the following description when read in connection with the accompanying drawings showing an illustrative embodiment of the invention and wherein:—

Fig. 1 is a detail transverse section of a portion of a wheel having the device applied thereto;

Fig. 2 is a detail transverse section on line 2—2 of Fig. 1;

Figure 3:
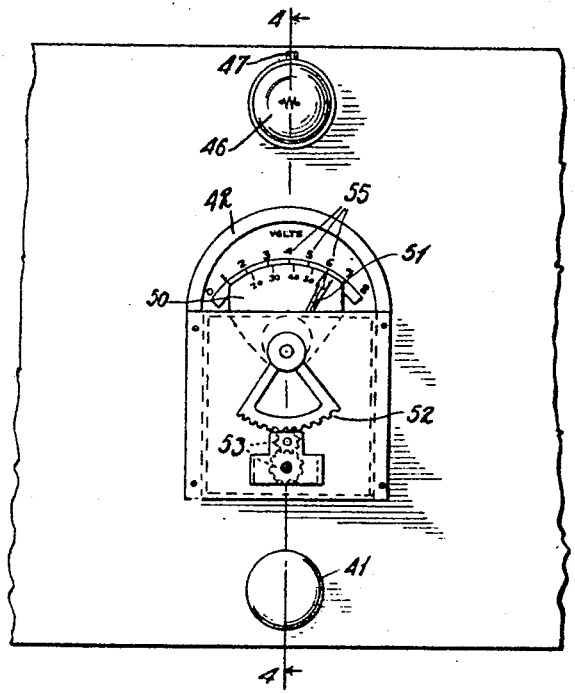
Fig. 3 is a detail elevation of the voltmeter with the cover removed.
Figure 4:
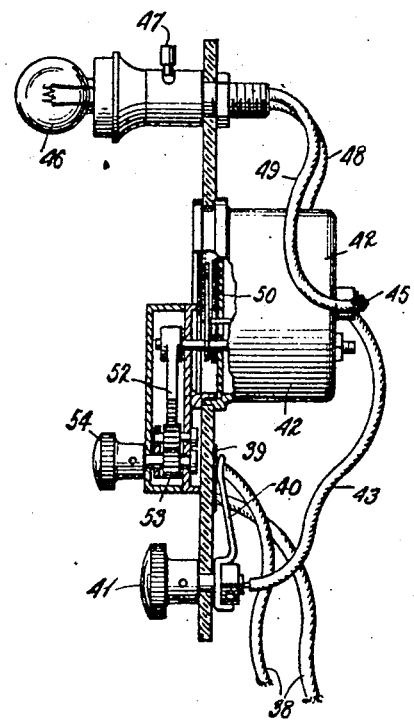
Fig. 4 is a vertical section on line 4—4 of Fig. 3.
Figure 5:
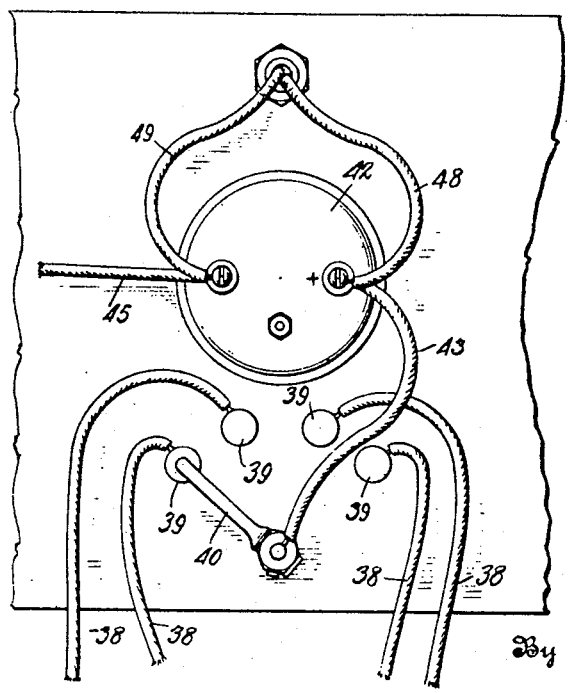
Fig. 5 is a rear view of the structure of Fig. 4.
Figure 6:
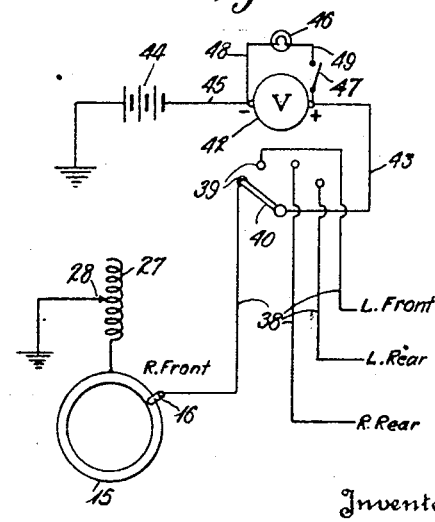
Fig. 6 is a diagram of circuits.

As shown the device comprises a casing 10 shown as mounted upon the exterior of a brake drum 11 carried by a wheel upon which is mounted a tire 12, the inflation of which is to be tested, the casing 10 revolving with the wheel.

A ring 13 is shown which is stationarily mounted upon the disc 14, which disc carries the operative means of the brake band not shown. A ring contact 15 is shown carried by the casing 10 which is contacted by a brush 16, the brush spring pressed against the ring as by means of a spring 17 which may be adjusted as to tension by means of a plug 18.

A pressure gauge 19 is shown housed in a cylinder 20 stationarily carried by the casing 10, the pressure gauge being of a usual form of spring 21 containing a flexible airtight rubber tube 22. As the tube is expanded, the spring 21 tends to rotate and to prevent such rotation, a head 23 carried by the spring is provided with pins 24 traveling in grooves 25 in the interior of a tube 26 of insulating material housed in the cylinder 20.

A coil of resistance wire 27 is shown carried by the outer surface of tube 26, which resistance wire is contacted by a brush 28 carried by the head 23 and projecting through a slot 29 formed in the wall of the tube.

To connect the tube or bag 22 with the interior of the tire, there is shown a tube 30 having a flange 31 clamped against the end of the pressure gauge by means of a screw block 32. The tube 30 is shown as leading to a fitting 33 connecting with the inner tube of the tire and which may be disconnected therefrom by a connection 34.

The fitting 33 is shown as formed of a T having a usual form of valve stem 35 connected therewith containing a pressure valve of the usual form and the tire may be inflated by removal of a valve cap 36 and by connection of the airhose thereto in the usual manner.

The brush 28 is grounded to the wheel of the automobile and one end of resistance wire 27 is connected to ring 13 by means of wire 37.

The brush 16 is shown as connected to the voltmeter by means of a wire 38.

It will be understood that each of the wheels of the vehicle is provided with mechanism such as shown in Figs. 1 and 2 and that the wires 38 connect with individual contacts 39 which may be contacted by a movable arm 40 turned by a finger button 41.

The voltmeter is indicated at 42 and one pole thereof is connected to the arm 40 by means of a wire 43, the other pole thereof being connected to battery 44 by means of wire 45.

A lamp 46 is shown for illumination of the dial of the voltmeter, the lamp being provided with a switch base in order that current through the lamp may be broken by movement of a switch lever 47. The lamp 46 is connected in parallel with the voltmeter by means of wires 48, 49.

In order that the device may read correctly even though the battery is not fully charged, there is provided according to the invention a movable dial 50 desirably graduated in pounds of pressure and which is provided with a marking 51 to determine its setting. The movable dial 50 may be revolved by means of a rack 52 meshing with pinions 53 which may be turned by means of a button 54. If the circuit through the lamp 46 is broken by opening the switch 47 and the arm 40 is placed into contact with any contact 39, the voltmeter will indicate the true voltage of the battery and a stationary graduation enumerated in volts by means of numerals will indicate the voltage of the battery.

If the movable dial 50 is then adjusted so that the marking 51 registers with the needle of the dial, the graduation in pounds upon the movable dial will give the correct pressure reading of each of the tires as the arm 40 is swung from one contact to another with the lamp 46 then thrown into circuit, it being understood that the voltmeter is of sufficiently high resistance so that current flowing through lamp 46 in parallel therewith will give an appreciable voltage drop.

In operation the pressure of the tire will at all times be applied to the pressure gauge 20 and more or less of resistance 27 will be included in the circuit when the circuit is closed by placing the arm 40 into contact with the contact 39 in connection with that tire and the pressure in the tire may be read directly from the movable dial 50.

The operation of the device will be clear from the above description.

Minor changes may be made in the physical embodiment of the invention within the scope of the appended claims without departing from the spirit of the invention.

I claim:

1. A tire inflation indicator comprising, in combination, a resistance element, a pressure operable device, a grounded contact carried by said device to vary the amount of said resistance in circuit, a voltmeter, means to connect said voltmeter with said resistance and to battery, means to ground the opposite pole of the battery and a resistance in parallel with said voltmeter whereby the drop of potential corresponding with the degree of inflation of the tire may be read upon said voltmeter.

2. A tire inflation indicator comprising, in combination, a pressure gauge in continuous communication with the inner tube of said tire, a resistance element adjacent the movable element of said pressure gauge, a contact carried by a movable portion of said pressure gauge and in contact with said resistance element, said contact grounded to the frame of the vehicle, a voltmeter having a movable dial, means to connect said resistance with said voltmeter and with a grounded battery, a resistance element connected in parallel with said voltmeter, means to break the circuit through said last named resistance and means whereby to adjust said dial in accordance with the condition of the charge of said battery whereby when said last named resistance is removed from circuit the dial may be adjusted to give a true reading of the degree of inflation of the tire when said last named resistance is restored to circuit.

3. A tire inflation indicator comprising, in combination, a pressure gauge comprising a pressure responsive element in continuous communication with the inner tube of the tire, a cylindrical member surrounding said pressure responsive element having a longitudinal slot in its wall, a resistance element wound upon said tube, a grounded contact member carried by the movable element of the said gauge, and traveling in said slot in contact with the turns of said resistance element, a voltmeter having a dial graduated to show the pressure of said tire in accordance with the amount of resistance in the circuit, a resistance element in parallel with said voltmeter whereby to cause the voltage drop dependent upon the inflation of the tire to read upon said voltmeter, means to connect the first named resistance element with the voltmeter and means to connect the voltmeter to a ground battery.

4. A tire inflation indicator comprising, in combination, a pressure gauge in communication with the interior of the tire to be tested, a resistance element carried by said pressure gauge, a grounded contact member carried by the movable element of said gauge and wiping said resistance element, a voltmeter connected to said resistance element and to a grounded battery, said battery and said gauge-carried-contact grounded upon the chassis of a vehicle, a lamp for illumination of the dial of said voltmeter connected in parallel therewith whereby to render possible the reading of the voltage drop of the voltmeter in accordance with the inflation of the tire.

5. A tire inflation indicator comprising, in combination, a pressure gauge in communication with interior of the tire to be tested, a resistance element carried by said gauge, a grounded contact member carried by the movable element of the gauge and wiping said resistance element, a voltmeter connected with said resistance element and with a grounded battery, a lamp for illumination of said voltmeter dial connected in parallel with the voltmeter, means to break the circuit through said lamp, a movable dial for said voltmeter and means whereby to adjust said dial in accordance with the charge of the battery when the circuit through said lamp is broken.

6. A tire inflation indicator comprising, in combination, a pressure gauge in communication with each of the tires of a vehicle, a resistance element carried by each gauge, a grounded contact member carried by the movable element of each gauge and wiping said resistance element, a plurality of buttons upon the dash, one button connected to each resistance element, a switch member movable into contact with the respective buttons, a voltmeter connected to said movable contact and to a grounded battery, a lamp in parallel with said voltmeter whereby the drop in voltage corresponding to each of said tires may be indicated upon said voltmeter as said movable contact sweeps said buttons.

7. A tire inflation indicator comprising, in combination, a pressure gauge having a movable element, a grounded contact member carried by said element, a variable resistance wiped by said contact, a voltmeter and a fixed resistance connected in parallel between said variable resistance and a grounded battery, a switch in said fixed resistance branch, a movable dial for said meter bearing graduations in pounds pressure of tire inflation and means whereby to adjust said movable dial to compensate for partial discharge of the battery, as indicated by the meter when said switch is opened.

8. A telemetric indicating system comprising, in combination, a variable condition device, an electrical circuit comprising a battery and a voltmeter, means to vary the resistance of said circuit in proportion to variations of condition of said device, and a resistance in parallel with said voltmeter whereby drop of potential corresponding with change of resistance of said circuit may be read upon said voltmeter to indicate the condition existing in said device.

9. A telemetric indicating system comprising, in combination, a variable condition device, an electrical circuit comprising a voltmeter and a battery whose voltage varies with its charge, a movable dial upon said voltmeter, a resistance in parallel with said voltmeter, means to break the circuit through said resistance, means to adjust said dial in accordance with the condition of charge of said battery when said resistance is cut out, and means to vary the resistance of said circuit in proportion to the condition of said device, whereby voltage drop in the circuit with said parallel resistance included may be read on said voltmeter to correctly indicate the condition of said device.

JOHN P. WEAVER.